(12) United States Patent
Sobel et al.

(10) Patent No.: US 7,979,260 B1
(45) Date of Patent: Jul. 12, 2011

(54) SIMULATING PXE BOOTING FOR VIRTUALIZED MACHINES

(75) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 577 days.

(21) Appl. No.: 12/059,817

(22) Filed: Mar. 31, 2008

(51) Int. Cl.
*G06F 17/50* (2006.01)

(52) U.S. Cl. .................... 703/13; 718/1; 713/2

(58) Field of Classification Search ............ 703/13, 703/20, 22; 718/1; 713/2, 1; 726/3, 22; 707/4; 709/224, 218, 208; 711/114; 717/177, 717/144, 136, 100
See application file for complete search history.

(56) References Cited

U.S. PATENT DOCUMENTS

| | | | |
|---|---|---|---|
| 2002/0049897 A1* | 4/2002 | Sekiguchi et al. | 713/1 |
| 2005/0076324 A1* | 4/2005 | Lowell et al. | 717/100 |
| 2005/0228950 A1* | 10/2005 | Karr | 711/114 |
| 2005/0229175 A1* | 10/2005 | McCrory et al. | 717/177 |
| 2007/0006178 A1* | 1/2007 | Tan | 717/136 |
| 2007/0162594 A1* | 7/2007 | Henry et al. | 709/224 |
| 2007/0198656 A1* | 8/2007 | Mazzaferri et al. | 709/218 |
| 2008/0005782 A1* | 1/2008 | Aziz | 726/3 |
| 2008/0028071 A1* | 1/2008 | Miyajima | 709/224 |
| 2008/0126785 A1* | 5/2008 | Chong et al. | 713/2 |
| 2008/0154985 A1* | 6/2008 | Childs et al. | 707/204 |
| 2008/0163207 A1* | 7/2008 | Reumann et al. | 718/1 |
| 2008/0244028 A1* | 10/2008 | Le et al. | 709/208 |
| 2008/0244254 A1* | 10/2008 | Cromer et al. | 713/2 |
| 2008/0250407 A1* | 10/2008 | Dadhia et al. | 718/1 |
| 2008/0263658 A1* | 10/2008 | Michael et al. | 726/22 |
| 2009/0077551 A1* | 3/2009 | Whiteley | 718/1 |

* cited by examiner

*Primary Examiner* — Kandasamy Thangavelu
(74) *Attorney, Agent, or Firm* — Brill Law Office; Jeffrey Brill

(57) ABSTRACT

The operating system agnostic PXE network booting environment is simulated, such that the VMs boot "virtually" from a network boot image, which is actually provided by the hypervisor. More specifically, the network traffic of VMs is filtered, and PXE requests are detected. Responsive to a detected PXE request, the hypervisor simulates the PXE server, and returns an invalid IP address to the VM for PXE communication. This invalid IP address is configured for only internal communication on a virtual network. The hypervisor intercepts PXE related communication sent by the VM to the invalid address, and returns expected PXE responses to the VM, including a boot image. This allows the hypervisor to provide, inspect and/or modify the boot time environment of VMs.

20 Claims, 1 Drawing Sheet

SIMULATING PXE BOOTING FOR VIRTUALIZED MACHINES

TECHNICAL FIELD

This invention pertains generally to computer virtualization, and more specifically to simulating Preboot Execution Environment (PXE) booting for virtual machines (VMs).

BACKGROUND

The co-filed and commonly assigned U.S. patent application Ser. No. 12/059,622, Sobel et al., entitled "VIRTUAL MACHINE FILE SYSTEM CONTENT PROTECTION SYSTEM AND METHOD" (The "VM FILE SYSTEM APPLICATION"), concerns shared, isolated, and secure file system content protection for virtualization platforms. The VM FILE SYSTEM APPLICATION is herein incorporated by reference in its entirety. The VM FILE SYSTEM APPLICATION addresses booting secured VMs as if they where booting from a network, so that they exclusively use a file system serviced by a hypervisor, such that all changes to the file system by secured VMs are fully controlled. Embodiments of the technology described by the VM FILE SYSTEM APPLICATION works very well under circumstances in which the vendor of the operating system that is booted on the VMs supports network booting. Embodiments of technology described by the VM FILE SYSTEM APPLICATION can be efficiently implemented by assuming control over the virtual BIOS of a secured VM, such that a custom and efficient interface can be used to effect network booting.

PXE is a well established standard for network booting of computing devices, and has been available since 1998. It is part of the Wired for Management ("WfM") initiative spearheaded by Intel. Under PXE, a client computer boots from a network by transferring a boot image file from a network server. The boot image can be in the form of the operating system to be booted on the client computer, or in the form of a pre-operating system agent that performs management tasks. PXE is not operating system specific; the transferred image file can implement any function that can be performed by other runtime code on the client computer.

In addition to a PXE component on the client, several PXE server components are also part of the system. The PXE process is started by the client sending a specially crafted Dynamic Host Configuration Protocol (DHCP) request to the PXE server. (DHCP is a protocol used by networked clients to obtain various parameters for operation on an Internet Protocol (IP) network.) The special DHCP request indicates to the PXE server that this DHCP request comprises a request by a PXE client to boot remotely. The PXE server responds by assigning the client to an IP address to use for PXE communication. After some handshaking using the assigned IP address, the PXE server uses Trivial File Transfer Protocol (TFTP) to transfer the boot image to the PXE client. PXE provides the glue that enables network booting of any operating system. However, PXE does not specifically provide any support for VMs, and does not support controlling the boot process on secured VMs.

It would be desirable to be able extend the control of network booting for secured VMs of the VM FILE SYSTEM APPLICATION to operating systems that do not support network booting, and to virtualization platforms over which a party does not have full control.

SUMMARY

Simulated network booting for VMs is enabled even for scenarios in which the operating system to be booted on the VMs does not support network booting, and on virtualization platforms over which the party implementing the network booting operations of the VMs does not have full control. The operating system agnostic PXE network booting environment is simulated, such that the VMs boot "virtually" from a network boot image, which is actually provided by the hypervisor. More specifically, the network traffic of VMs is filtered, and PXE requests are detected. Responsive to a detected PXE request, the hypervisor simulates the PXE server, and returns an invalid IP address to the VM for PXE communication. This invalid IP address is configured for only internal communication on a virtual network. The hypervisor intercepts PXE related communication sent by the VM to the invalid address, and returns expected PXE responses to the VM, including a boot image. This allows the hypervisor to provide, inspect and/or modify the boot time environment of VMs.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
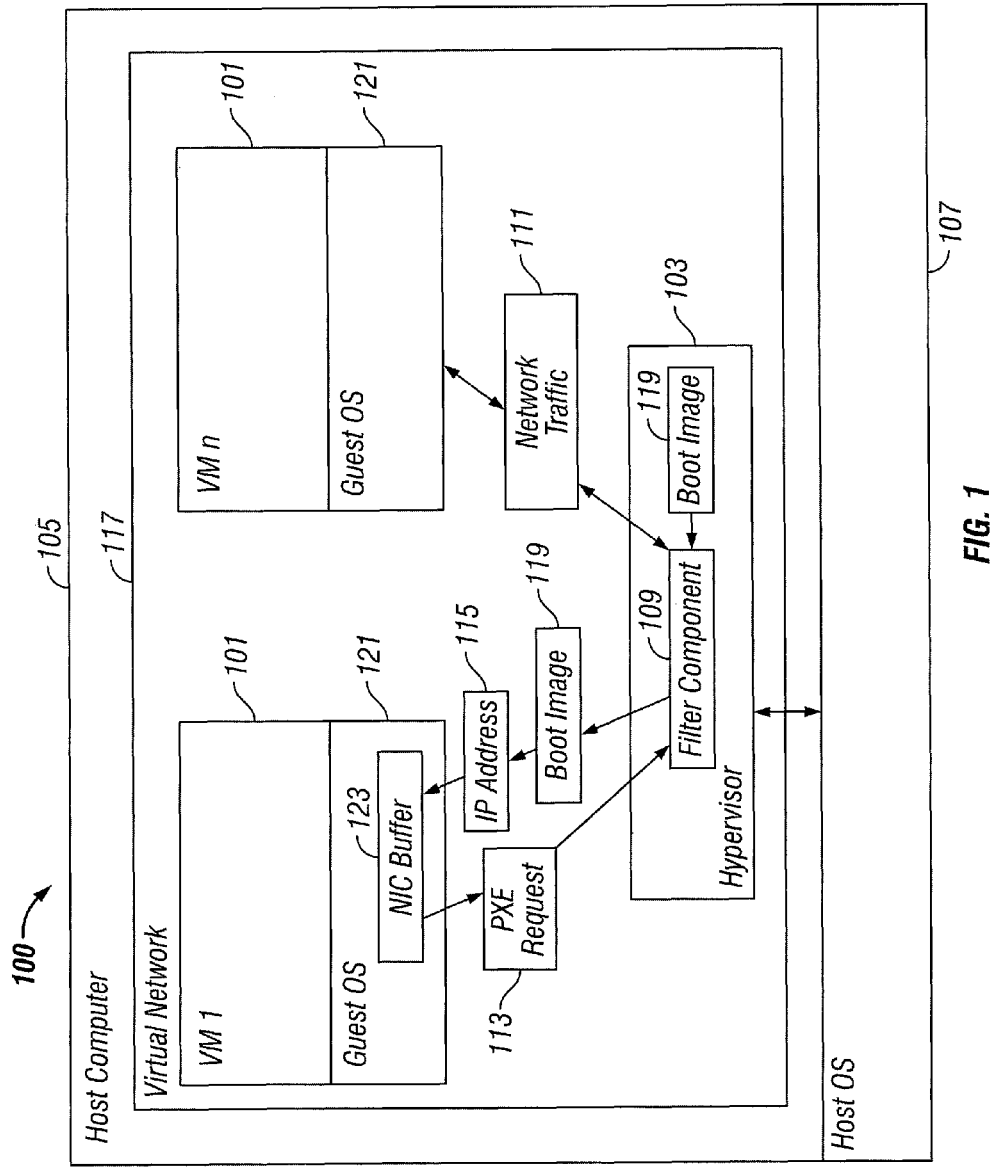
FIG. 1 is a block diagram illustrating simulating PXE booting for VMs, according to some embodiments of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a system 100 for simulating PXE booting for VMs 101, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

In the embodiment illustrated in FIG. 1, a hypervisor 103 acts as an interface between one or more VMs 101 running on a single (host) physical computer 105 and a (host) operating system 107 running on that physical computer 105. As will be understood by those of ordinary skill in the relevant art, in various virtualization scenarios, the hypervisor 103 can act as an interface between the VMs 101 and the host operating system 107 for some or all of the functions of the VMs 101. In other virtualization implementations, there is no underlying host operating system 107 running on the physical computer 105. In those situations, the hypervisor 103 acts as an interface between the VMs 101 and the hardware of the physical computer 105. Even where a host operating system 107 is present, the hypervisor 103 sometimes interfaces directly with the hardware for certain services. In the embodiment illustrated in FIG. 1, the hypervisor 103 acts as such an interface to the host operating system 107 for network traffic 111 between VMs 101 and other components, such as other VMs 101 on the same physical computer 105, VMs 101 on another host 105, or remote physical computing devices 105. (Where communication is between VMs 101 on the same physical computer 105, the communication can be thought of as occurring on a virtual network 117.)

It is to be understood that in other embodiments of the present invention, the hypervisor 103 can interface directly with the hardware for such services. In general, in various embodiments of the present invention, the hypervisor 103 can interact with a host operating system 107 and/or directly with the hardware of the physical computer 105 as desired. It is to be further understood that the services described herein as being performed by a hypervisor 103 are, under certain virtualization scenarios, performed by a component with a different name, such as "supervisor virtual machine," "virtual machine manager (VMM)," "service partition," or "domain 0 (dom0)." Of course, the name used to denote the component(s) performing specific functionality is not important.

A network filter component 109 within the hypervisor 109 filters network traffic 111 to and from VMs 101, and detects instances of PXE tagged DHCP requests 113. Such a request 113 from a VM 101 indicates that the VM 101 is a PXE client, seeking to boot remotely. Upon detecting the request 113, the filter component 109 returns an invalid IP address 115 to the VM 101. This invalid IP address 115 is configured for internal VM 101 to VM 101 communication (e.g., 127.0.0.100, etc). The VM 101 proceeds to use the invalid IP address 115 for PXE based communication. The filter component 109 intercepts PXE related communication sent to this special address 115, and returns the appropriate TFTP payload (e.g., a boot image 119 to be utilized by the VM 101). Thus, the filter component 109 is herein acting as a simulated PXE server, passing the PXE boot block 119 over this controlled channel. By intercepting PXE related communication sent to the PXE server and transmitting expected responses including the boot image 119, the filter component 109 simulates the entire PXE exchange. This allows the hypervisor 103 to provide and control the operating system to be booted by the VMs 103 (the guest operating system 121).

The implementation mechanics of the above described network filtering capabilities within a virtualization context are within the skill set of those of ordinary skill in the relevant art. The use thereof within the context of the present invention will be readily apparent to one of such a skill level in light of this specification. It is known by those of such a skill level that various virtualization environments provide a hypervisor 103 which has control over the network interface used by VMs 101 under its supervision. Such virtualization environments (e.g., Intel vPro®, VMware®, Microsoft Hyper-V®) supply programming interfaces that allow such network filtering.

Note that in the above described embodiment, no PXE communication actually occurs outside of the host computer 105. All of the PXE network requirements are satisfied by the simulated services, provided by the filter component 109. The ability to contain the PXE/TFTP traffic within the virtual network 117 is an important security feature, and provides a significant advantage over simply implementing a physical PXE server on a physical network accessible to a VM 101. Such an un-contained implementation in which the PXE traffic would be transmitted across a physical network external to the host computer 105 would be susceptible to tampering, in addition to being slow. The above described embodiment, on the other hand, is not only secure but also extremely efficient, as the filter component 109 has direct access to the (virtual) Network Interface Card (NIC) buffers 123 of the VMs 101. For example, with Intel vPro® type filtering architectures, simulated PXE server responses can be directly placed into the secured VM's NIC buffers 123 without having to engage in any actual network traffic, even on the contained virtual network 117.

By employing the simulated PXE operations described above, controlled network booting for secured VMs 101 can be provided. By utilizing simulated PXE, this can be accomplished even under scenarios in which the guest operating system 121 does not support network booting, and on virtualization platforms over which the party implementing the network booting operations of the VMs 101 does not have full control. This enables the hypervisor 103 to inspect or modify the boot time environment of VMs 101. This enables the assurance that the VMs 101 exclusively use a file system (not illustrated) serviced by the hypervisor 103, such that all changes to the file system by the secured VMs 101 are fully controlled. Thus, those features of the VM FILE SYSTEM APPLICATION can be provided even where the guest operating system 121 does not support network booting, and where the virtualization platform is not under the full control of the party implementing network booting. It is to be understood, however, that the simulated PXE booting described herein is not limited to such uses. Simulated PXE booting for VMs 101 is useful in its own right, and makes network booting for VMs 101 possible, even under circumstances under which it is otherwise not, as described above. The above description refers to an embodiment in which the network booting that is simulated is PXE booting specifically. It is to be understood that the present invention is not so limited, and in other embodiments can be instantiated within the context of other network booting scenarios, provided that network booting in question is agnostic as to which guest operating system 121 is booted.

As will be understood by those familiar with the art, the invention may be embodied in other specific forms without departing from the spirit or essential characteristic's thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for simulating network booting in a virtualization environment, the method comprising the steps of:
    filtering network communications of at least one virtual machine running on a physical computing device;
    detecting, in filtered network communication, a request from a virtual machine to receive a boot image from a server;
    returning an invalid IP address to the virtual machine, said invalid IP address being configured for only internal communication on a virtual network;
    intercepting communication sent by the virtual machine to the invalid address; and
    transmitting at least one response to the virtual machine, said at least one response comprising at least a boot image.

2. The method of claim 1 wherein said simulated network booting further comprises simulated preboot execution environment (PXE) booting, said steps further comprising:
    detecting, in filtered network communication, a request from a virtual machine to receive a boot image from a PXE server;
    returning an invalid IP address to the virtual machine for PXE communication, said invalid IP address being configured for only internal communication on a virtual network;
    intercepting PXE related communication sent by the virtual machine to the invalid address; and
    transmitting at least one PXE response to the virtual machine, said at least one PXE response comprising at least a boot image.

3. The method of claim 1 wherein:
    said steps are performed by a component of a hypervisor running on the same physical computer as the at least one virtual machine.

4. The method of claim 3 further comprising:
    the virtual machine using the transmitted boot image to boot a guest operating system provided by the hypervisor.

5. The method of claim 3 further comprising:
    the hypervisor ensuring that the virtual machine uses only a file system controlled by the hypervisor, such that all changes to the file system made by the virtual machine are controlled by the hypervisor.

6. The method of claim 1 further comprising:
    reading communication sent by the virtual machine directly from a virtual network interface card (NIC) buffer associated with the virtual machine.

7. The method of claim 1 further comprising:
    writing related communication directly to a virtual NIC buffer associated with the virtual machine.

8. The method of claim 7 wherein writing related communication directly to a virtual NIC buffer associated with the virtual machine further comprises:
    writing the boot image directly to the virtual NIC buffer associated with the virtual machine.

9. A computer readable storage medium containing computer executable instructions which when executed on a computer perform simulated network booting in a virtualization environment, the computer executable instructions comprising instructions for:
    filtering network communications of at least one virtual machine running on a physical computing device;
    detecting, in filtered network communication, a request from a virtual machine to receive a boot image from a server;
    returning an invalid IP address to the virtual machine, said invalid IP address being configured for only internal communication on a virtual network;
    intercepting communication sent by the virtual machine to the invalid address; and
    transmitting at least one response to the virtual machine, said at least one response comprising at least a boot image.

10. The medium of claim 9 wherein said simulated network booting further comprises simulated preboot execution environment (PXE) booting, said computer executable instructions further comprising:
    instructions for detecting, in filtered network communication, a request from a virtual machine to receive a boot image from a PXE server;
    instructions for returning an invalid IP address to the virtual machine for PXE communication, said invalid IP address being configured for only internal communication on a virtual network;
    instructions for intercepting PXE related communication sent by the virtual machine to the invalid address; and
    instructions for transmitting at least one PXE response to the virtual machine, said at least one PXE response comprising at least a boot image.

11. The medium of claim 9 wherein:
    said instructions are for performing said steps by a component of a hypervisor running on the same physical computer as the at least one virtual machine.

12. The medium of claim 11 further comprising:
    instructions for the virtual machine using the transmitted boot image to boot a guest operating system provided by the hypervisor.

13. The medium of claim 11 further comprising:
    instructions for the hypervisor ensuring that the virtual machine uses only a file system controlled by the hypervisor, such that all changes to the file system made by the virtual machine are controlled by the hypervisor.

14. The medium of claim 9 further comprising:
    instructions for reading communication sent by the virtual machine directly from a virtual NIC buffer associated with the virtual machine.

15. The medium of claim 9 further comprising:
    instructions for writing related communication directly to a virtual network interface card (NIC) buffer associated with the virtual machine.

16. The medium of claim 15 wherein the instructions for writing related communication directly to a virtual NIC buffer associated with the virtual machine further comprises:
    instructions for writing the boot image directly to the virtual NIC buffer associated with the virtual machine.

17. A computer system for simulating network booting in a virtualization environment, the computer system comprising:
    means for filtering network communications of at least one virtual machine running on a physical computing device;
    means for detecting, in filtered network communication, a request from a virtual machine to receive a boot image from a server;

means for returning an invalid IP address to the virtual machine, said invalid IP address being configured for only internal communication on a virtual network;

means for intercepting communication sent by the virtual machine to the invalid address; and means for transmitting at least one response to the virtual machine, said at least one response comprising at least a boot image.

18. The computer system of claim 17 wherein said simulated network booting further comprises simulated preboot execution environment (PXE) booting, said means further comprising:

means for detecting, in filtered network communication, a request from a virtual machine to receive a boot image from a PXE server;

means for returning an invalid IP address to the virtual machine for PXE communication, said invalid IP address being configured for only internal communication on a virtual network;

means for intercepting PXE related communication sent by the virtual machine to the invalid address; and means for transmitting at least one PXE response to the virtual machine, said at least one PXE response comprising at least a boot image.

19. The computer system of claim 17 wherein:

said means are for performing said steps by a component of a hypervisor running on the same physical computer as the at least one virtual machine.

20. The computer system of claim 19 further comprising:

means for the hypervisor ensuring that the virtual machine uses only a file system controlled by the hypervisor, such that all changes to the file system made by the virtual machine are controlled by the hypervisor.

* * * * *

UNITED STATES PATENT AND TRADEMARK OFFICE
CERTIFICATE OF CORRECTION

PATENT NO. : 7,979,260 B1
APPLICATION NO. : 12/059817
DATED : July 12, 2011
INVENTOR(S) : William E. Sobel and Bruce McCorkendale It is certified that error appears in the above-identified patent and that said Letters Patent is hereby corrected as shown below:

Col. 4, line 40, replace "characteristic's thereof" with "characteristics thereof"

Col. 5, line 66, replace "A computer readable storage medium" with "A non-transitory computer readable storage medium"

Signed and Sealed this
Ninth Day of August, 2011

David J. Kappos
*Director of the United States Patent and Trademark Office*